United States Patent
Baldi et al.

(10) Patent No.: US 10,491,529 B2
(45) Date of Patent: Nov. 26, 2019

(54) AUTOMATIC RULE GENERATION FOR FLOW MANAGEMENT IN SOFTWARE DEFINED NETWORKING NETWORKS

(71) Applicant: Cisco Technology, Inc., San Jose, CA (US)

(72) Inventors: Mario Baldi, Brooklyn, NY (US); Han Hee Song, San Jose, CA (US); Antonio Nucci, San Jose, CA (US); Marco Mellia, Turin (IT); Martino Trevisan, Turin (IT); Idilio Drago, Turin (IT)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 15/639,914

(22) Filed: Jun. 30, 2017

(65) Prior Publication Data

US 2019/0007327 A1 Jan. 3, 2019

(51) Int. Cl.
*H04L 12/851* (2013.01)
*H04L 12/721* (2013.01)
*H04L 12/715* (2013.01)
*H04L 29/12* (2006.01)

(52) U.S. Cl.
CPC .......... *H04L 47/2483* (2013.01); *H04L 45/38* (2013.01); *H04L 45/64* (2013.01); *H04L 61/1511* (2013.01)

(58) Field of Classification Search
CPC ... H04L 12/281; H04L 29/12; H04L 47/2483; H04L 61/1511
See application file for complete search history.

(56) References Cited

U.S. PATENT DOCUMENTS

| | | | |
|---|---|---|---|
| 2003/0079056 A1* | 4/2003 | Taylor | H04L 45/00 710/1 |
| 2012/0278464 A1* | 11/2012 | Lehane | H04L 12/1407 709/223 |
| 2013/0262678 A1* | 10/2013 | Tung | G06F 9/5072 709/226 |
| 2014/0119367 A1* | 5/2014 | Han | H04L 12/4633 370/389 |
| 2014/0206403 A1* | 7/2014 | Buckley | H04W 4/14 455/466 |

(Continued)

OTHER PUBLICATIONS

Hu, et al., "Balanceflow: Controller Load Balancing for Openflow Networks," 2012 IEEE 2nd International Conference on Cloud Computing and Intelligent Systems (CCIS), Oct.-Nov. 2012, 6 pages.

(Continued)

*Primary Examiner* — Chi Ho A Lee
(74) *Attorney, Agent, or Firm* — Edell, Shapiro & Finnan, LLC (57) ABSTRACT

In an example embodiment, a Software Defined Networking (SDN) application identifies a domain based on a destination address of a packet that is associated with a primary service. The domain corresponds to the primary service, and the primary service is configured to trigger one or more support flows from one or more ancillary services. The SDN application identifies the one or more support flows based on the domain, and generates one or more rules for distribution to one or more network elements that handle packets of the one or more support flows from the one or more ancillary services.

20 Claims, 7 Drawing Sheets

(56) References Cited

U.S. PATENT DOCUMENTS

| | | | | |
|---|---|---|---|---|
| 2015/0215235 | A1* | 7/2015 | Li | H04L 47/782 370/235 |
| 2015/0350064 | A1* | 12/2015 | Kano | H04L 45/54 370/389 |
| 2015/0350154 | A1* | 12/2015 | Myla | H04L 61/1511 709/245 |
| 2016/0218960 | A1* | 7/2016 | Sundarababu | H04L 45/08 |
| 2016/0315847 | A1* | 10/2016 | Zhang | H04L 12/6418 |
| 2017/0026291 | A1* | 1/2017 | Smith | H04L 45/12 |
| 2017/0237609 | A1* | 8/2017 | Yin | H04L 41/0806 709/222 |
| 2018/0048579 | A1* | 2/2018 | Svedberg | H04L 43/022 |

OTHER PUBLICATIONS

Kandoi, et al., "Denial-of-Service Attacks in OpenFlow SDN Networks," 2015 IFIP/IEEE International Symposium on Integrated Network Management (IM), May 2015, 5 pages.

Bermudez, et al., "DNS to the Rescue: Discerning Content and Services in a Tangled Web," Proceedings of the 2012 Internet Measurement Conference, Nov. 2012, 14 pages.

Bianco, et al., "On-the-fly Traffic Classification and Control with a Stateful SDN approach," retrieved from http://www.telematica.polito.it/~giaccone/papers/stateful17.pdf on Jun. 30, 2017, 7 pages.

Callado, et al., "A Survey on Internet Traffic Identification," IEEE Communications Surveys & Tutorials, vol. 11, No. 3, Aug. 2009, 16 pages.

Bermudez, et al., "A Distributed Architecture for the Monitoring of Clouds and CDNs: Applications to Amazon AWS," IEEE Transactions on Network and Service Managements, vol. 11, No. 4, Dec. 2014, 14 pages.

Bermudez, et al., "Exploring the Cloud from Passive Measurements: the Amazon AWS Case," 2013 Proceedings IEEE Infocom, Apr. 2013, 5 pages.

Drago, et al., "Inside Dropbox: Understanding Personal Cloud Storage Services," Proceedings of the 2012 Internet Measurement Conference, Nov. 2012, 14 pages.

Drago, "Understanding and Monitoring Cloud Services," Doctoral Thesis, University of Twente, Dec. 2013, Part 1, 50 pages.

Drago, "Understanding and Monitoring Cloud Services," Doctoral Thesis, University of Twente, Dec. 2013, Part 2, 50 pages.

Drago, "Understanding and Monitoring Cloud Services," Doctoral Thesis, University of Twente, Dec. 2013, Part 3, 73 pages.

Wang, et al., "FloodGuard: A DoS Attack Prevention Extension in Software-Defined Networks," 45th Annual IEEE/IFIP International Conference on Dependable Systems and Networks (DSN), Jun. 2015, 12 pages.

Foremski, et al. "DNS-Class: immediate classification of IP flows using DNS," International Journal of Network Management, Jun. 2014, 17 pages.

Grimaudo, et al., "Self-Learning Classifier for Internet Traffic," 2013 IEEE Conference on Computer Communications Workshops (INFOCOM WKSHPS), Apr. 2013, 6 pages.

Gupta, et al., "SDX: A Software Defined Internet Exchange," Proceedings of the 2014 ACM Conference on SIGCOMM, Aug. 2014, 12 pages.

Harris, "Distributional Structure," Word, vol. 10, 1954, Published online Dec. 2015, 17 pages.

Hofstede, et al., "Flow Monitoring Explained: From Packet Capture to Data Analysis with NetFlow and IPFIX," IEEE Communications Surveys & Tutorials, vol. 16, No. 4, May 2014, 29 pages.

Jain, et al., "B4: Experience with a Globally-Deployed Software Defined WAN," Proceedings of the ACM SIGCOMM 2013 conference on SIGCOMM, Aug. 2013, 12 pages.

Jeong, et al., "Application-aware Traffic Management for OpenFlow Networks," 2016 18th Asia-Pacific Network Operations and Management Symposium (APNOMS), Oct. 2016, 5 pages.

Kandula, et al., "What's Going on? Learning Communication Rules in Edge Networks," Proceedings of the ACM SIGCOMM 2008 Conference on Data Communication, Aug. 2008, 12 pages.

Karagiannis, et al., "BLINC: Multilevel Traffic Classification in the Dark," Proceedings of the 2005 Conference on Applications, Technologies, Architectures, and Protocols for Computer Communications, Aug. 2005, 12 pages.

Kim, et al., "Internet Traffic Classification Demystified: Myths, Caveats, and the Best Practices," Proceedings of the 2008 ACM CoNEXT Conference, Article 11, Dec. 2008, 12 pages.

Kreutz, et al., "Software-Defined Networking: A Comprehensive Survey," Proceedings of the IEEE, vol. 103, No. 1, Jan. 2015, Part 1, 30 pages.

Kreutz, et al., "Software-Defined Networking: A Comprehensive Survey," Proceedings of the IEEE, vol. 103, No. 1, Jan. 2015, Part 2, 33 pages.

McKeown, et al., "OpenFlow: Enabling Innovation in Campus Networks," ACM SIGCOMM Computer Communication Review, vol. 38, No. 2, Apr. 2008, 6 pages.

Mekky, et al., "Application-aware Data Plane Processing in SDN," Proceedings of the Third Workshop on Hot Topics in Software Defined Networking, Aug. 2014, 6 pages.

Mori, et al., "SFMap: Inferring Services over Encrypted Web Flows Using Dynamical Domain Name Graphs," 7th Workshop on Traffic Monitoring and Analysis (TMA), Apr. 2015, 14 pages.

Moshref, et al., "Flow-level State Transition as a New Switch Primitive for SDN," Proceedings of the Third Workshop on Hot Topics in Software Defined Networking, Aug. 2014, 6 pages.

Naylor, et al., "The Cost of the "S" in HTTPS," Proceedings of the 10th ACM International on Conference on Emerging Networking Experiments and Technologies, Dec. 2014, 7 pages.

Ng, et al., "Developing a Traffic Classification Platform for Enterprise Networks with SDN: Experiences & Lessons Learned," 2015 IFIP Networking Conference, May 2015, 9 pages.

Openflow, "OpenFlow Switch Specification," Version 1.5.0, Protocol Version 0x06, Dec. 2014, Part 1, 50 pages.

Openflow, "OpenFlow Switch Specification," Version 1.5.0, Protocol Version 0x06, Dec. 2014, Part 2, 50 pages.

Openflow, "OpenFlow Switch Specification," Version 1.5.0, Protocol Version 0x06, Dec. 2014, Part 3, 50 pages.

Openflow, "OpenFlow Switch Specification," Version 1.5.0, Protocol Version 0x06, Dec. 2014, Part 4, 50 pages.

Openflow, "OpenFlow Switch Specification," Version 1.5.0, Protocol Version 0x06, Dec. 2014, Part 5, 77 pages.

Zhang, et al., "CODA: Toward Automatically Identifying and Scheduling COflows in the Dark," Proceedings of the 2016 ACM SIGCOMM Conference, Aug. 2016, 14 pages.

Chowdhury, et al., "Coflow: A networking Abstraction for Cluster Applications," Proceedings of the 11th ACM Workshop on Hot Topics in Networks, Oct. 2012, 6 pages.

Chowdhury, et al., "Efficient Coflow Scheduling with Varys," Proceedings of the 2014 ACM Conference on SIGCOMM, Aug. 2014, 12 pages.

Donovan, et al., "Intentional Network Monitoring: Finding the Needle without Capturing the Haystack," Proceedings of the ACM Workshop on Hot Topics in Networks, Oct. 2014, 7 pages.

Dixit, et al., "Towards an Elastic Distributed SDN Controller," Proceedings of the Second ACM SIGCOMM Workshop on Hot Topics in Software Defined Networking, Aug. 2013, 6 pages.

Plonka, et al., "Flexible Traffic and Host Profiling via DNS Rendezvous," Securing and Trusting Internet Names: SATIN 2011, Apr. 2011, 8 pages.

Popa, et al., "Macroscope: End-Point Approach to Networked Application Dependency Discovery," Proceedings of the 5th International Conference on Emerging Networking Experiments and Technologies, Dec. 2009, 12 pages.

Qazi, et al., "Application-Awareness in SDN," Proceedings of the ACM SIGCOMM 2013 Conference on SIGCOMM, Aug. 2013, 2 pages.

Qazi, et al., "SIMPLE-fying Middlebox Policy Enforcement Using SDN," Proceedings of the ACM SIGCOMM 2013 Conference on SIGCOMM, Aug. 2013, 12 pages.

(56) References Cited

OTHER PUBLICATIONS

Xie, et al., "ReSurf: Reconstructing Web-Surfing Activity From Network Traffic," 2013 IFIP Networking Conference, May 2013, 14 pages.
Tongaonkar, et al., "Towards Self Adaptive Network Traffic Classification," Computer Communications, vol. 56, Feb. 2015, 12 pages.
Trevisan, et al., "Towards Web Service Classification Using Addresses and DNS," 2016 International Wireless Communications and Mobile Computing Conference (IWCMC), Sep. 2016, 6 pages.
Trevisan, et al., "WHAT: A Big Data Approach for Accounting of Modern Web Services," 2016 IEEE International Conference on Big Data, Dec. 2016, 6 pages.
Vissicchio, et al., "Central Control Over Distributed Routing," Proceedings of the 2015 ACM Conference on Special Interest Group on Data Communication, Aug. 2015, 14 pages.
Wang, et al., "TeleScope: Flow-Level Video Telementry using SDN," Proceedings of the European Workshop on Software Defined Networks, Oct. 2016, 6 pages.
Yao, et al., "SAMPLES: Self Adaptive Mining of Persistent LExical Snippets for Classifying Mobile Application Traffic," Proceedings of the 21st Annual International Conference on Mobile Computing and Networking, Sep. 2015, 13 pages.
Zhao, et al. "Building Application-Aware Network Environments Using SDN for Optimizing Hadoop Applications," Proceedings of the 2016 ACM SIGCOMM Conference, Aug. 2016, 2 pages.

\* cited by examiner

AUTOMATIC RULE GENERATION FOR FLOW MANAGEMENT IN SOFTWARE DEFINED NETWORKING NETWORKS

TECHNICAL FIELD

The present disclosure relates to managing flows in a Software Defined Networking (SDN) network.

BACKGROUND

When a user of a SDN network accesses a primary web service (e.g., website), the primary service typically triggers/prompts flows associated with a number of ancillary services. These ancillary services may provide analytics, web-tracking, video services, etc. for the primary service. This may also occur for mobile and cloud applications, both of which typically use the same protocol as web services (namely Hypertext Transfer Protocol (HTTP) or HTTP Secure (HTTPS)). Often, a network administrator of the SDN network may wish to handle flows associated with certain primary services and corresponding ancillary services different than flows associated with other primary services and corresponding ancillary services.

DESCRIPTION OF EXAMPLE EMBODIMENTS

Overview

In an example embodiment, an SDN application identifies a domain based on a destination address of a packet that is associated with a primary service. The domain corresponds to the primary service, and the primary service is configured to trigger one or more support flows from one or more ancillary services. The SDN application identifies the one or more support flows based on the domain, and generates one or more rules for distribution to one or more network elements that handle packets of the one or more support flows from the one or more ancillary services.

Example Embodiments

It is often desired to handle traffic/network flows associated with certain services different than traffic/network flows associated with other services. For example, in a corporate environment, it may be desired for traffic from business-critical services to be prioritized over traffic from employee leisure services (e.g., social media, personal email, etc.). In other cases, it may be desired for traffic belonging to different services to be forwarded along different routes.

Accordingly, provided herein are techniques for addressing the challenge of handling traffic in a SDN. As described in greater detail below, a SDN application identifies traffic as relating to a particular service (e.g., mobile/web/cloud service). The SDN application generates, via programmable logic, a set of protocol field-based rules for forwarding elements in the network to allow the forwarding elements (e.g., switches) of the network to route the traffic according to policies desired by the network administrator. As such, the SDN application programs (via a controller) the forwarding elements to process a packet based on rules relating to protocol fields in the packet.

Figure 1:
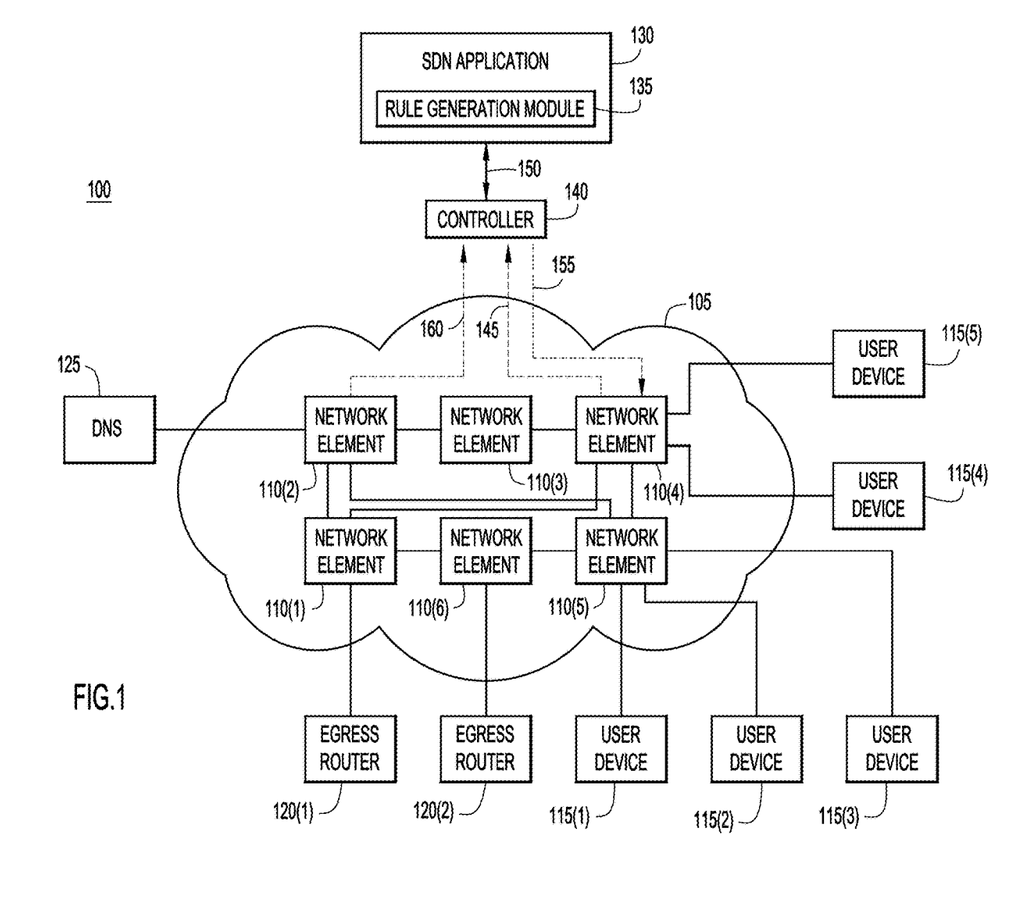
FIG. 1 is block diagram of a computing environment that is configured to implement automated flow management techniques, according to an example embodiment.

With reference to FIG. 1, shown is a computing/networking environment 100 that implements automated flow management techniques in accordance with examples presented herein. The computing/networking environment 100 includes a Software-Defined Networking (SDN) network 105 that is managed using SDN techniques. The network 105 includes network elements 110(1)-(6) (e.g., SDN-enabled switches, routers, wireless access points, etc.). There are also egress routers 120(1) and 120(2) on the edge of network 105. In an example, user devices 115(1)-(5) enable respective users to access the Internet via egress routers 120(1) and (2)) through network elements 110(1)-(6). Domain Name Server (DNS) 125 is also connected to network 105 via network element 110(2). As explained in greater detail below, the SDN application 130 includes a rule generation module 135 that generates rules for handling certain packet flows by network elements in the network 105. Controller 140 manages the network elements in network 105, and in so doing, distributes the rules from SDN application 130 to one or more of the network elements 110(1)-(6).

Figure 2:
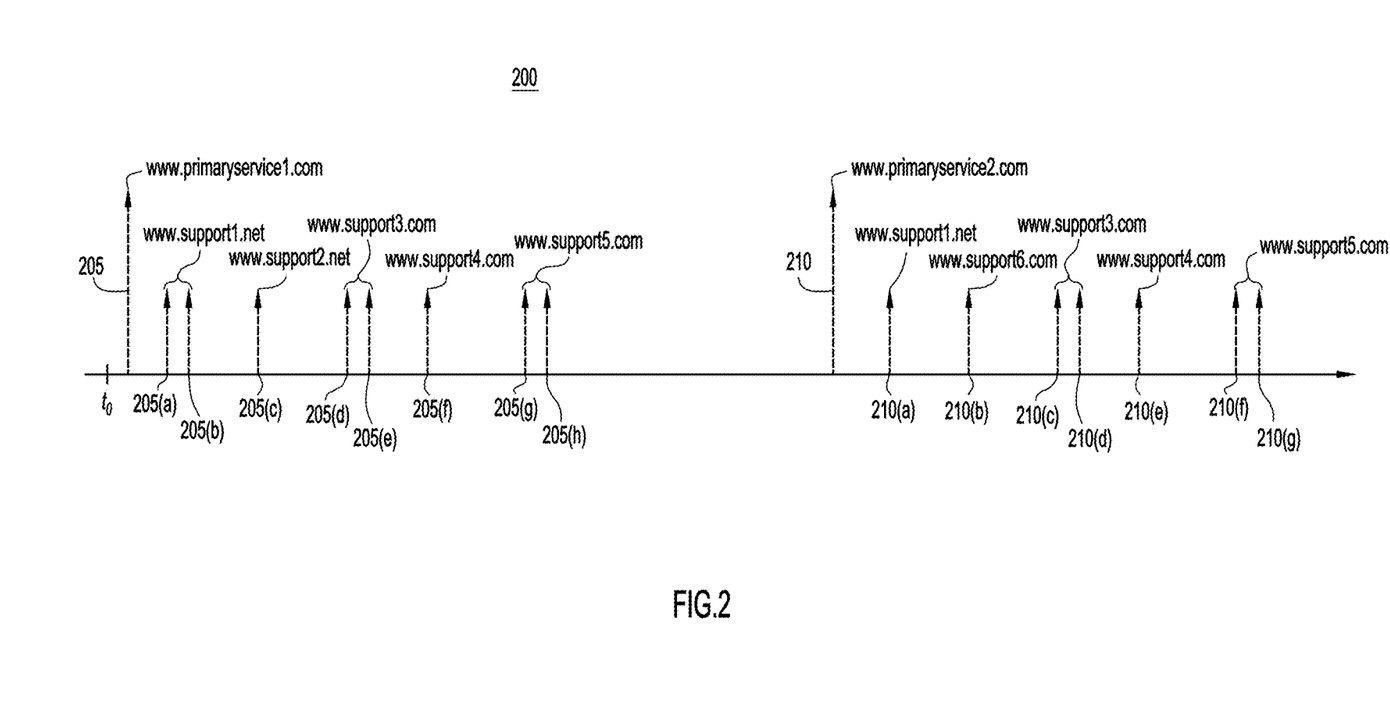
FIG. 2 is a timeline of flows for respective primary and ancillary services, according to an example embodiment.

Turning now to FIG. 2, and with continued reference to FIG. 1, shown is a timeline 200 of flows (represented by arrows 205, 205(a)-(h), 210, 210(a)-(g)) for respective primary and ancillary services in accordance with examples presented herein. One or more network elements 110(1)-(6) in SDN network 105 may handle flows 205, 205(a)-(h), 210, 210(a)-(g). Flows 205 and 210 are associated with primary services, and arrows 205(a)-(h) and 210(a)-(g) represent support flows associated with ancillary services. When processed by a user device 115(1)-115(5), flows 205 and 210 trigger respective support flows 205(a)-(h) and 210(a)-(g) to/from respective ancillary services (i.e., all objects a browser or terminal downloads and posts when the user accesses a primary service).

In an example, a user of user device 115(4) directly accesses primary service 1. For instance, the user may input the domain name www.primaryservice1.com into a web browser on the user device 115 (4). This generates a flow 205 of one or more packets each having a destination or source address that is associated with primary service 1. Upon receiving the flow 205 via egress routers 120(1) and/or 120(2) and processing the corresponding information, user device 115(4) originates support flows 205(a)-(h) from ancillary services (e.g., support 1, support 2, etc.) as triggered by primary service 1. These ancillary services provide analytics, advertisements, video and image download, etc. for primary service 1 at the user device 115(4).

Sometime later, a user of user device 115(5) directly accesses primary service 2. For instance, the user may input the domain name www.primaryservice2.com into a web browser on the user device 115(5). This generates a flow 210 of one or more packets each having a source or destination address that is associated with primary service 2. Upon user device 115(5) receiving the flow 210 and processing the corresponding information, support flows 210(*a*)-(*g*) from ancillary services (e.g., support 1, support 2, etc.) are generated as triggered by primary service 2. These ancillary services provide analytics, advertisements, video and image download, etc. for primary service 2 and provide flows to/from the user device 115(5).

In an example, SDN network 105 is a network of a business or enterprise that wishes to prioritize traffic related to business critical/educational services (e.g., primary service 2) over traffic related to employee leisure services (e.g., primary service 1. As such, it may be desired to deprioritize support flows 205(*a*)-(*h*) (i.e., flows related to primary service 1, which is considered an employee leisure service) relative to support flows 210(*a*)-(*g*). In conventional networks, it would be difficult for a network administrator to configure the network to consistently prioritize support flows 210(*a*)-(*g*) over support flows 205(*a*)-(*h*) because prioritization rules are based on source and destination IP addresses, source and destination transport ports, transport protocol, and/or higher layer protocol information. These are the same for a subset of support flows 205(*a*)-(*h*) and 210(*a*)-(*g*) that share ancillary services (i.e., support 1, support 3, support 4, and support 5).

For example, a network administrator may wish to prioritize support flow 210(*a*), which is associated with primary service 2, over support flow 205(*a*), which is associated with primary service 1. However, a conventional network may be unable to consistently differentiate between support flow 205(*a*) and support flow 210(*a*) because both support flows correspond to the ancillary service support 1, and hence share the same protocol information at various protocol layers. As a result, conventional approaches perform relatively poorly because they fail to identify many flows associated with a given service. Difficulties in handling packets/flows also arise in more complex scenarios, such as situations in which flows associated with primary services may appear to be flows associated with support domains (e.g., when a service may be a primary service in certain situations and an ancillary service in other situations, as is the case with certain online social media networks).

Layer 3 (e.g., Internet Protocol (IP) addresses) or Layer 4 (e.g., Transmission Control Protocol (TCP) ports) information alone may not permit a network administrator of a conventional network to accurately determine the traffic belonging to a particular service. Traditionally, network traffic is identified by transport ports and possibly server Internet Protocol (IP) addresses. But state-of-the-art applications (e.g., mobile/web/cloud services) generally use HyperText Transfer Protocol (HTTP), and hence rely on TCP connections to port 80 or port 443 of a server. As a result, TCP ports are not sufficiently useful for instructing a network how to accurately handle traffic. As for IP addresses, cloud providers that host multiple services may execute servers offering different services. On the other hand, because of the widespread deployment of Content Delivery Networks (CDN) to ensure that clients access topologically close content, the same service may be provided by several hosts in geographically dispersed locations. Hence, the information offered by an IP address is coarse because a single cloud (and CDN) server (i.e., with one IP address) can host a multitude of services, and a single service can be hosted by a multitude of servers (i.e., multiple IP addresses). In addition, the convergence toward encrypted protocols (e.g., HTTP Secure) has rendered Deep Packet Inspection (DPI)-based matching ineffective.

As such, presented herein are per-service management techniques for handling a variety of support flows associated with multiple primary flows, even where flows are served by the same server (e.g., in the cloud), the same (encrypted) protocol, and multiple servers (e.g., in a CDN). As mentioned, in an example, the user of user device 115(4) generates flow 205, which includes one or more packets each having a source or destination address that is associated with primary service 1. Referring to FIG. 1, the user device 115(4) transmits flow 205 to network element 110(4). The network element 110(4) transmits the first packet in the flow 205 to controller 140, as illustrated by dashed arrow 145. The SDN application 130 receives the first packet from controller 140 via northbound interface 150 and generates rules for handling traffic. In this example, the rule generation module 135 generates a rule for network element 110(4) (illustrated by dashed arrow 155) to deprioritize support flow 205(*a*). Before generating flow 205, the user device 115(4) may perform a DNS resolution by sending a DNS query to DNS 125. Network element 110(2) is configured to duplicate the DNS response and send the DNS response to the controller 140 (illustrated by dashed arrow 160). The DNS response may indicate an association of the destination address of the packet with the destination domain (e.g., the domain name input by a user of one of the client devices 115(1)-115(5)). The controller 140 delivers the DNS response to the SDN application 130 via the northbound interface. The rule generation module 135 may utilize the information obtained from DNS 125 via network element 110(2) to generate a rule.

As mentioned, sometime after flow 205 is generated, the user of user device 115(5) generates flow 210, which includes one or more packets each having a destination address that is associated with primary service 2. The user device 115(5) transmits flow 210 to network element 110(4). The network element 110(4) transmits the first packet in the flow 210 to controller 140, as illustrated by dashed arrow 145. The rule generation module 135 generates a subsequent rule for network element 110(4) (illustrated by dashed arrow 155) to prioritize support flow 210(*a*). In this example, network element 110(4) is able to deprioritize support flow 205(*a*) relative to support flow 210(*a*). This is because the controller 140 installed the first rule (i.e., the rule to deprioritize flows associated with support 1) on the network element 110(4) before the network element 110(4) received support flow 205(*a*).

In this example, the rule associated with support flow 205(*a*) does not apply to support flow 210(*a*) because these flows were initiated by different user devices. That is, support flow 205(*a*) was initiated by user device 115(4), and support flow 210(*a*) was initiated by user device 115(5). As such, the rule associated with support flow 205(*a*) does not apply to support 210(*a*), even if the rule associated with support flow 205(*a*) has not expired by the time network element 110(4) receives support flow 210(*a*). In another example, if multiple support flows are initiated by a single user device, the SDN application may assign a period of time after which a rule associated with one of the support flows is to expire. Thus, as described in greater detail below, the rule generating module 135 enables the SDN network 105 to handle a variety of support flows associated with multiple primary flows by associating each support flow with the primary service in real time and with high accuracy.

Figure 3:
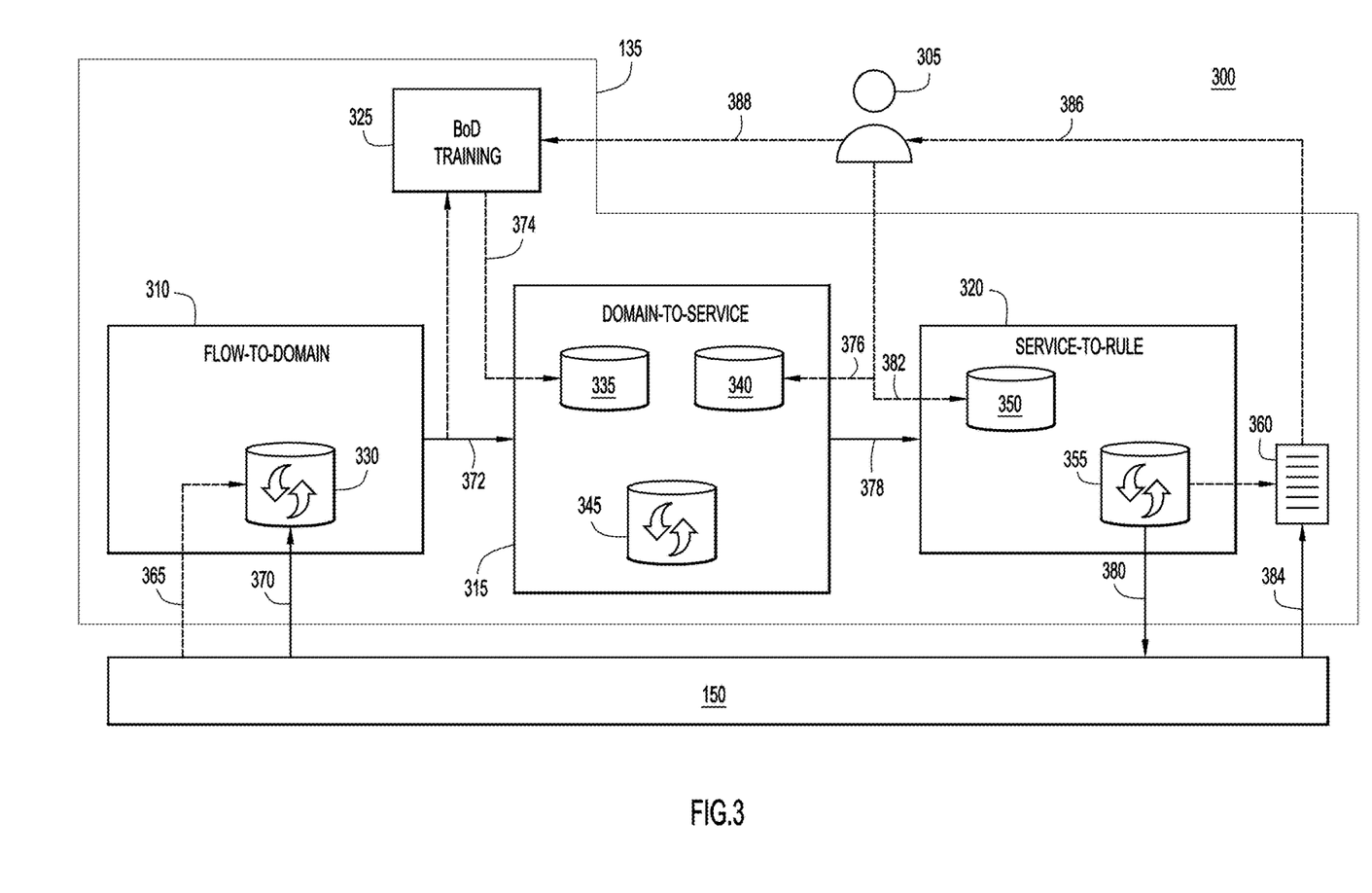
FIG. 3 is a diagrammatic illustration of an automated flow management method, according to an example embodiment.

With reference to FIG. 3, and continuing reference to FIG. 1, shown is a diagrammatic illustration 300 of a flow management method in accordance with examples presented herein. A network administrator 305 may interact with various submodules of rule generation module 135, which interacts with the controller 140 (not shown) via the northbound interface 150. The rule generation module 135 includes a flow-to-domain submodule 310, a domain-to-service submodule 315, a service-to-rule submodule 320, and a Bag of Domains (BoD) training submodule 325. The flow-to-domain submodule 310 includes a local cache 330. The domain-to-service submodule 315 includes self-learned BoDs 335, static BoDs 340, and an active service database 345. The service-to-rule submodule 320 includes user policies 350 and a service statistics database 355. The service statistics database 355 is operable to communicate with service accounting 360.

Flow-to-domain submodule 310, domain-to-service submodule 315, service-to-rule submodule 320, and BoD training submodule 325 serve logically distinct functions to enable per-service management. A BoD is the set of support domains (e.g., www.support1.net, www.support2.net, www.support3.com, etc.) and the core domain associated with the primary service (e.g., primary service 1) triggering the ancillary services associated with the support domains. In an example, per-service management enables a network administrator to manage, steer, and account for all flows in a BoD associated with a given primary service. Briefly, the flow-to-domain submodule 310 identifies a domain name based on a destination address of a forwarded packet. The domain-to-service submodule 315 identifies support flows based on the domain name, temporal proximity to a primary service domain name, and/or BoD models (either statically configured (static BoDs 340) or dynamically identified (self-learned BoDs 335)), and associates the support flows with the corresponding primary service. The service-to-rule submodule 320 generates one or more rules for distribution to the network elements 110(1)-110(6). BoD training submodule 325 dynamically identifies BoDs. Each of these submodules are described in turn below.

Flow-to-domain Submodule 310

The flow-to-domain submodule 310 associates a domain with a flow to create named flows. Initially, network elements 110(1)-110(6) may forward selected packets to the controller 140 according to certain default rules. These rules may include:

1. Forwarding all DNS response packets from DNS 125 as normal, and mirroring the DNS response packets to the controller 140.
2. Forwarding the first packet of all TCP flows to the controller 140.
3. Forwarding the first packets of all User Datagram Protocol (UDP) flows to the controller 140.

The controller 140 may communicate information associated with the forwarded packets to the SDN application 130 via northbound interface 150. Table 1 below provides example default rules to be installed on network elements 110(1)-110(6).

TABLE 1

| N | Match | Action | Description |
|---|---|---|---|
| 1 | IP_PROTO = UDP and UDP_SRC = 53 | Forward, Forward to Controller | Spill DNS responses |
| 2 | IP_PROTO = TCP and TCP_FLAGS = PURE_SYN | Forward to Controller | Intercept new TCP connections |
| 3 | IP_PROTO = UDP and UDP_DST! = 53 | Forward to Controller | Intercept all UDP non-DNS traffic |

The default rules may have a low priority in order to avoid overriding rules that the controller 140 will subsequently install on the network elements 110(1)-(6). Rule 1 causes the flow-to-domain submodule 310 to receive (e.g., via network element 110(2)) a copy of each DNS response packet (arrow 365). Rules 2 and 3 cause the flow-to-domain submodule 310 to receive, via one or more of network elements 110(1)-(6), a TCP or UDP packet (arrow 370). In a possible implementation, after receiving a UDP packet, the SDN application installs a (higher priority) rule specific to the UDP flow (i.e., between specific pairs of hosts and ports) to forward packets directly to the corresponding destination. This prevents further UDP packets of the same flow to be forwarded to the controller. This rule may have an inactivity timeout after which the rule is removed to ensure that the first packet (or few packets) of new flows will be forwarded to the controller based on the default rule.

Servers are identified by their respective IP addresses, which are typically associated with respective Fully Qualified Domain Names (also referred to herein as domains). For each received DNS response packet 365, the flow-to-domain submodule 310 extracts the clientIP address ClientIP (e.g., the IP address of the user device 115(4)), the domain being queried QueriedDomain (e.g., www.primaryservice1.com), and, from the answer record of the DNS response, the list of resolved IP addresses ServerIP$_i$. The flow-to-domain submodule 310 generates keys {ClientIP, ServerIP$_i$} and, for each key, inserts (or rewrites) an entry having the value QueriedDomain. Thus, the flow-to-domain submodule 310 maintains the local cache 330 as a key-value store, where the key is {ClientIP, ServerIP$_i$}, and the value is QueriedDomain.

When flow-to-domain submodule 310 receives a TCP or UDP packet 370 from the controller 140, the flow-to-domain submodule 310 parses the IP and layer 4 headers of the packet 370 and accesses the name store with the key {ClientIP, ServerIP$_i$} to fetch the previously resolved QueriedDomain. In case there is no such key, the store returns the ServerIP. The flow-to-domain submodule 310 then forwards the named flow to the domain-to-service submodule 315 (arrow 372) along with the QueriedDomain or, if unavailable, the ServerIP.

Using DNS information has several advantages over more intrusive flow classification methods. First, DNS information does not require using costly DPI technology to extract a hostname or Server Name Indication (SNI) from HTTP, HTTPS, Secure Sockets Layer (SSL), Transport Layer Security (TLS), or other high layer protocol requests. Second, DNS information is not protected by encryption; even DNS Security Extensions (DNSSEC) does not provide confidentiality and does not hinder the techniques described herein. Third, flow-to-domain submodule 310 may perform the lookup on the first packet of a flow, thereby eliminating the need to maintain a per-flow state and wait for additional packets. In addition, it is rare for erroneous domain associations to occur due to collisions/rewrite operations (e.g., where a clientIP contacts same serverIP for two different QueriedDomains).

Domain-to-service Submodule 315

Once domain-to-service submodule 315 receives the named flow 372, the domain-to-service submodule 315 associates the named flow 372 with ancillary services/support flows. The domain-to-service submodule 315 stores self-learned BoDs 335 and/or static BoDs 340. The self-learned and static BoDs 335, 340 include all support domains that are contacted when a user accesses a primary service. As explained below, the BoD training module 325 automatically builds self-learned BoDs 335 (arrow 374). As an example, self-learned BoDs 335 may be based on web services that a user explicitly accesses from a web browser (e.g., on user device 115(4)). Additionally/alternatively, the network administrator 305 may manually build static BoDs 340. In other words, the domain-to-service submodule 315 may receive, from a network administrator 305, an indication of an association of a core domain/flow and one or more support domains, and store the indication. As an example, static BoDs 340 may be beneficial for background services that are periodically accessed by terminals without user intervention (e.g., software updates, file synchronization with cloud storage services, calendar or mail services, etc.).

example, the domain-to-service submodule 315 uses Algorithm 1 below to associate each flow f with a primary service domain (also referred to herein as a core domain). The domain-to-service submodule 315 receives (i) the current named flow; (ii) the set of BoDs, each including the corresponding core domain; and (iii) the average duration t for each domain. The domain-to-service submodule 315 determines address to domain association on a per-client basis and maintains separate data structures for each ClientIP. The domain-to-service submodule 315 outputs the named flow annotated with the core domain and possibly a service name (or annotated as "unknown" if unable to associate any core domain with the named flow).

| Algorithm 1 annotate(f, C, BoDs, T) | |
|---|---|
| Input: | |
|     f | ▷ The current flow to annotate |
|     C = {$c_1,...,c_k$} | ▷ Core Domains |
|     BoDs = {$BoD_{c_1},...,BoD_{c_k}$} | ▷ BoDs of core domains in C |
|     T = {$t_{d_1},...,t_{d_l}$} | ▷ Domain average flow duration |
| Output: | |
|     O = (f,CoreDomain) | ▷ Annotated flow |
| 1:    // Retrieve start time and domain of f | |
| 2:    t = GetTime( ) | ▷ Get current time |
| 3:    $d_f \leftarrow$ parse(f) | ▷ Get the domain of f |
| 4:    // Remove expired Services | |
| 5:    AS $\leftarrow$ {$(ts,te,c_i,BoD_{c_i}) \in AS | t \leq te$} | |
| 6:    // Obtain the best BoD among the AS | |
| 7:    $as_{best} \leftarrow$ {$(ts,te_{best},c_{best},BoD)$} $\leftarrow$ BestBod($d_f$,AS) | |
| 8:    if $d_f \in C \wedge as_{best} == \emptyset$ then | |
| 9:        // $d_f$ is a core domain – Start a new AS for $d_f$ | |
| 10:       c = $d_f$ | |
| 11:       AS $\leftarrow$ AS + {$(t, t + t_c, c, BoD_c)$} | |
| 12:       O $\leftarrow$ (f,c) | |
| 13:    else | |
| 14:       if $as_{best} \neq \emptyset$ then | |
| 15:          O $\leftarrow$ (f,$c_{best}$) | ▷ The flow is assigned to $c_{best}$ |
| 16:          // Update the AS validity time | |
| 17:          $te_{best} \leftarrow$ max(t + $t_{d_f}$,$te_{best}$) | |
| 18:       else | |
| 19:          O $\leftarrow$ (f,"unknown") | ▷ Flow not classified |

In a possible configuration, the domain-to-service submodule 315 may first try to associate the received flow 372 with a self-learned BoD 335. If there is no match, the domain-to-service submodule 315 may then try to associate the received flow 372 with a static BoD 340. In another possible configuration, static BoDs 340 may be given higher priority than self-learned BoDs 335.

The network administrator 305 may also manually configure static BoDs 340, user policies, and domain-to-service mapping. Moreover, the network administrator may audit and/or approve/remove self-learned BoDs 340 before they are transferred from the BoD training submodule 325 to the domain-to-service submodule 315.

Figure 4:
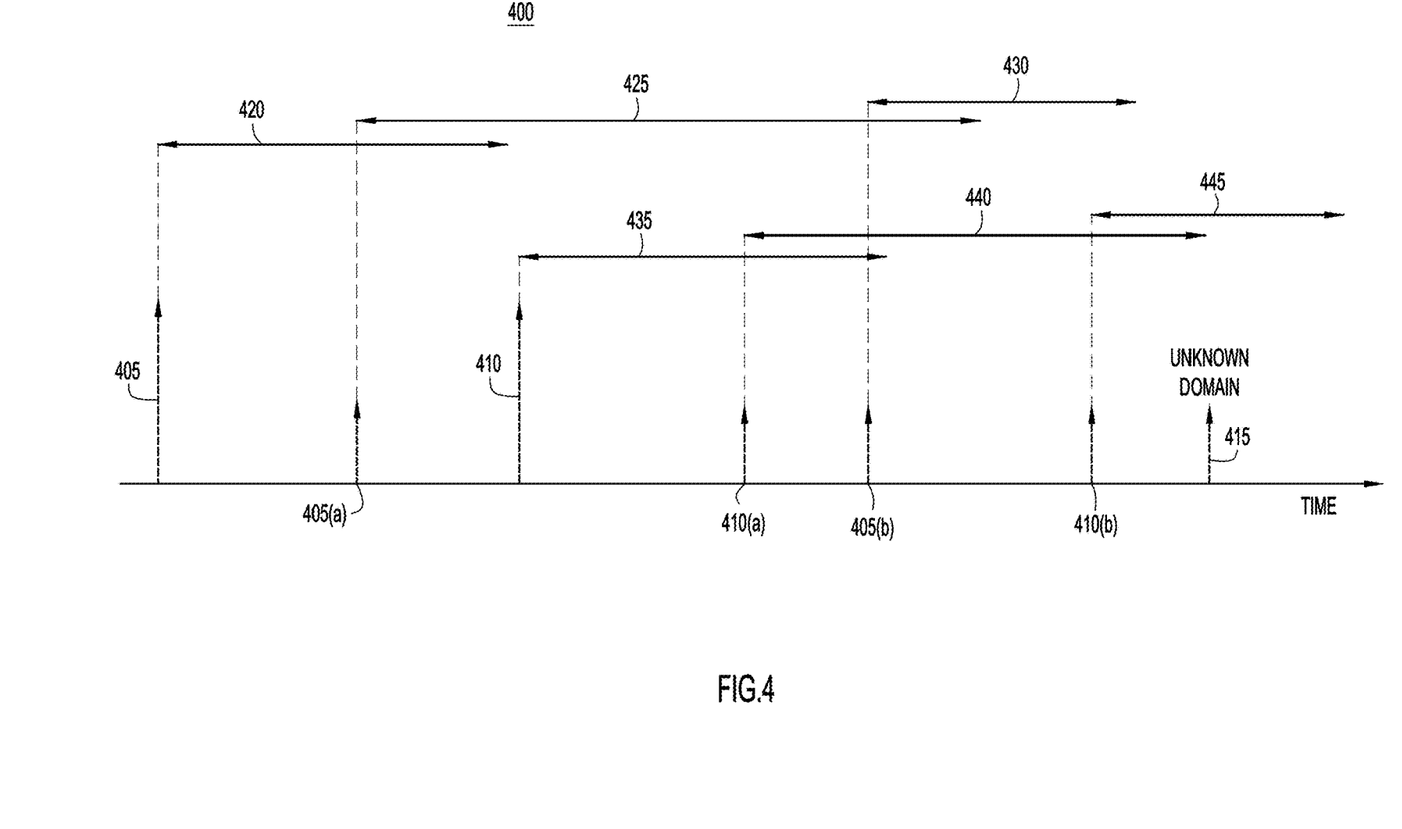
FIG. 4 is another timeline of flows for respective primary and ancillary services, according to an example embodiment.

Turning now to FIG. 4, and with continued reference to FIGS. 1 and 3, shown is a timeline 400 of flows for respective primary (associated with a core domain) and ancillary (associated with a support domain) services in accordance with examples presented herein. Timeline 400 shows a first core flow 405 (associated with a core domain) and corresponding support flows 405(a)-(b) (associated with respective support domains) as well as subsequent core flow 410 and corresponding support flows 410(a)-(b). Also shown is an unknown domain 415, which is not a known core domain, and is not listed as a support domain in any static or self-learned BoD 335, 340.

In timeline 400, a client initiates the first core flow 405 and, at a later time, initiates subsequent core flow 410. In an Algorithm 1 is based on the concept of an evaluation window (e.g., a time during which a support flow may appear after the observation of the core flow c). For example, arrow 420 represents the evaluation window for core flow 405, arrow 425 represents the evaluation window for support flow 405(a), and arrow 430 represents the evaluation window for support flow 405(b). Similarly, arrow 435 represents the evaluation window for core flow 410, arrow 440 represents the evaluation window for support flow 410(a), and arrow 445 represents the evaluation window for support flow 410(b).

The domain-to-service submodule 315 maintains active service database 345, which includes core domains that were recently accessed by each ClientIP and for which the respective evaluation windows are still open. Given a domain that corresponds to the primary service, the domain-to-service submodule 315 determines whether the domain appears in the active service database 345. The domain-to-service submodule 315 may identify support flows based on the domains that appear in the active service database 345 at a particular time. The active service database 345 grows as new core domains are observed (lines 8-12 of Algorithm 1), and shrinks as evaluation windows expire (line 5 of Algorithm 1). For example, the core domain associated with core flow 405 may remain in the active service database 345 until evaluation window 420 expires.

As noted, the same support flows normally appear in multiple BoDs for different core domains. The active services database 315 helps the domain-to-service module 315 determine the core domains to which support flows correspond. The domain-to-service submodule 315 determines whether there exists an active service $as_{best}$ whose BoD includes the domain of f. If more than one active service matches (i.e., if multiple core domains may potentially match a given support flow), $as_{best}$=BestBoD($d_f$, ActiveService) is the core domain whose evaluation window start time is the closest in time to the reception of the support flow (line 7 of Algorithm 1). Intuitively, the most recently visited core domain is the most likely one to match the current support domain. However, other matching options (e.g., random choice, weighted choice by frequency of occurrence in BoD, etc.) may be implemented.

The domain-to-service submodule 315 may also resolve the ambiguity for domains that may appear as both support and core domains. For instance, if there exists an active service $as_{best}$ (line 14 of Algorithm 1) in which $d_f$ appears as a support domain, the domain-to-service module 315 may conclude that $d_f$ is a support domain. In this example, the domain-to-service module 315 associates $d_f$ with the core domain $c_{best}$ (line 15 of Algorithm 1), and extends the evaluation window ending time t_$C_{best}$ (line 15 of Algorithm 1) to consider the average duration of the current flow t_$d_f$. This is because flows to support domains may be observed long after the core domain is observed, since the terminal may continue downloading objects due to user action (e.g., scrolling down a web page may trigger the download of new elements, or the download of a new video chunk in a streaming service). In timeline 400, for example, support flow 405($a$) triggers evaluation window 425 to extend evaluation window 420. The domain-to-service submodule 315 may then forward the packet 378, along with the corresponding service, to the service-to-rule submodule 320.

On the other hand, if $d_f$ is a possible core domain, and there exists no active service in which $d_f$ appears as a support domain (line 8 of Algorithm 1), then $d_f$ may be considered a new core domain. In this example, the domain-to-service module 315 may determine that a user has intentionally accessed the domain, and therefore open a new evaluation window (lines 9-12 of Algorithm 1) and add the domain to the active service database 345. Once domain-to-service submodule 315 has associated flow 372 with a service, the domain-to-service submodule 315 forwards the packet 378 to the service-to-rule submodule 320.

Service-to-rule Submodule 320

The service-to-rule submodule 320 is a policing module that implements policies by requesting the SDN controller 140 to install the appropriate rules on one or more of network elements 110(1)-(6) (arrow 380). The network administrator 305 may define and store policies/rules in the user policies database 350 (arrow 382 in FIG. 3). The service-to-rule submodule 320 accesses user policies database 350 with the service name (received from the domain-to-service submodule 315) as the key, and retrieves the corresponding policy from the user policies database 350. The rules may include rules to block a core flow and/or one or more support flows; a rule to route a core flow or one or more support flows on a specific path and/or to a specific device; and/or a rule to prioritize or deprioritize a core flow and/or one or more support flows relative to one or more other network flows. As noted, rules may expire after some time. For example, rules may expire using the Idle Timeout standard OpenFlow feature.

In certain situations, no special rules are necessary for primary/support flows. For example, TCP flows may require no extra rules beyond the default rules because only the SYN-TCP packet may be forwarded to the controller 140. However, for UDP packets, the lack of an explicit connection indication requires the controller 140 to insert a rule for each UDP flow so that subsequent packets are not forwarded to the controller. As such, the service-to-rule submodule 320 forwards, to the SDN controller 140, rules to install on one or more of the network elements 110(1)-110(6). The service-to-rule submodule 320 may also forward the (TCP or UDP) packet to the controller 140. The controller 140 may then inject the packet back into SDN network 105.

The service-to-rule submodule 320 also maintains a service statistics database 355. Service statistics database 355 includes a key and a value. In an example, a flow identifier (e.g., five classic tuple) is the key, and service information is the value. For example, when a rule expires at network element 110(4), network element 110(4) forwards the corresponding flow identifier and statistics (e.g., byte and packet amount) to the SDN controller 140 (e.g., via Flow-Removed messages). The SDN controller 140 then forwards this information to the SDN application 130 (arrow 384). The service-to-rule submodule 320 collects the statistics and stores the statistics in the service statistics database 355 that associates key values with flow identifiers. These statistics may be exposed to the network administrator 305 (arrow 386) and/or used for BoD training (arrow 388). This enables, for instance, per-service accounting 360, anomaly detection, billing, etc. In an example, the service-to-rule submodule 320 may determine the amount of traffic due to a primary service by counting, via per-service accounting 360, a number of received packets of flows that will enable direct access to the primary service.

The service-to-rule submodule 320 may also store statistics relating to a number of times a first packet of the flow is received by the SDN application 130 through the controller 140. In another example, the service-to-rule submodule 320 may determine a number of times a primary service is directly accessed by counting, via per-service accounting 360, the number of received first packets. The service-to-rule submodule 320 may also/alternatively determine an amount of traffic generated when the primary service is accessed, and/or a number of packets exchanged when the primary service is accessed. The service-to-rule submodule 320 may also store statistics relating to a number of times a first packet of the flow received by the SDN application 135 is not forwarded because the flow is in violation of a policy.

BoD Training Submodule 325

The BoD training submodule 325 may monitor one or more flows that enabled direct access to one or more primary services, and produce an indication of an association of a core domain and one or more support domains. Due to the complex composition of web pages and the intertwined nature of Internet traffic, it is not trivial to design BoD training submodule 325, which is configured to identify BoDs with minimal human intervention. In an example, C is a set of core domains provided by the network administrator 305. The BoD training submodule 325 builds/updates a $BoD_c$ for each core domain c ∈ C using data collected from the network. When a client is observed initiating a flow to domain c, the domain of flows that follow are inserted in $BoD_c$. This is complicated because a single user may access multiple services within a short time frame (e.g., using multiple browser tabs), and the terminal may contact other services (e.g., for software updates or background services). In addition, the same support domain may belong to multiple BoDs, or a domain may be associated with a primary service in certain situations and an ancillary service in other situations.

Figure 5:
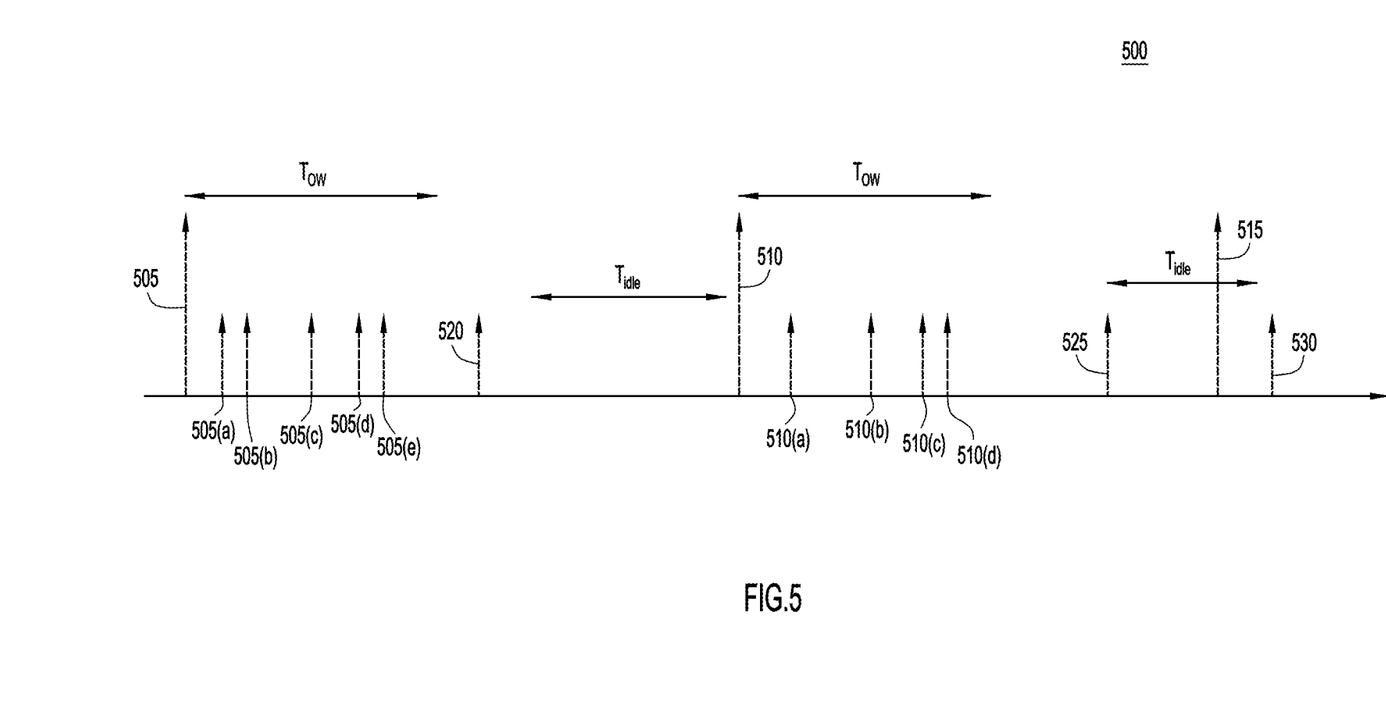
FIG. 5 is yet another timeline of flows for respective primary and ancillary services, according to an example embodiment.

As discussed above, the flow-to-domain submodule 310 outputs each named flow 372 (also referred to herein as f) generated by each ClientIP. With reference to FIG. 5, and with continued reference to FIGS. 1 and 3, shown is a timeline of flows for primary services visited by a client, as well as the corresponding support flows, in accordance with examples presented herein. The timeline includes core flow 505 and corresponding support flows 505(a)-(e), core flow 510 and corresponding support flows 510(a)-(d), and core flow 515. Also shown are flows 520, 525, and 530. Flow 515 is not identified as a core flow because flow 515 appears less than $T_{idle}$ seconds after the previous flow. In this example, a new BoD is started only if there is a gap of $T_{idle}$ seconds before the subsequent core domain. This constraint may be relaxed (e.g., by setting $T_{idle}$ equal to zero).

$T_{idle}$ is configurable, and choosing a larger value for $T_{idle}$ makes the BoD training submodule 325 more conservative. In FIG. 5, the BoD training submodule 325 identifies coreflows 505 and 510, but not core flow 515, as core domains. When a new core domain is observed, the BoD training submodule 325 opens an observation window of duration Tow. All domains of flows observed in Tow are tentatively inserted in the $BoD_c$. For example, the BoD training submodule 325 tentatively associates support flows 505(a)-(e) with core flow 505 because support flows 505(a)-(e) are in Tow. By contrast, the BoD training submodule 325 does not identify flow 520 as a support flow of core flow 505 because flow 520 is outside of Tow. In general, a longer Tow increases (1) the amount of information that may be collected and (2) the likelihood of polluting the $BoD_C$ with false support domains. For example, if Tow was increased to include flow 520, BoD training submodule 325 would incorrectly identify flow 520 as a support domain of core flow 505. Algorithm 2 below is an example pseudocode for updating $BoD_c$.

browsers, devices, configurations, etc.). The BoD training submodule 325 may store domains in a least recently used cache of size limited to 5,000 entries. This size may be more than adequate while limiting memory usage.

The BoD training submodule 325 may further compute the average flow duration for each domain in $BoD_c$. The BoD training submodule 325 may use the flow duration information as exposed by the service-to-rule submodule 320. For instance, for each domain d, the rule generation module 135 may maintain the average flow duration $t_d$. The rule generation module 135 may use an exponential moving average estimator (e.g., with parameter $\alpha=0.1^3$). In an example, each flow duration is obtained by computing the time between the rule install action and the FlowRemoved message, and subtracting the Idle Timeout set in the SDN network element(s). The BoD training submodule 325 BoDs may continuously update statistics. For example, the service-to-rule submodule 320 may periodically (e.g., one per hour) freeze the statistics and provide the statistics to the domain-to-service submodule 315 for annotation (arrow 374 in FIG. 3).

These techniques are preferable to active crawling (e.g., artificially visiting the service/website of c and noting resulting contacted support domains) for a number of reasons. The same service/website changes its responses (i.e., the content of the core flow, the support flows, and the content of the support flows) when accessed from different identities, locations, time, browsers, devices, configuration, etc. Also, the service associated with c may require authentication, or the use of a specific application that complicates the support flows. In addition, active crawling has scalability issues.

Returning now to FIG. 1, rule generation module 135 produces rules for network elements 110(1)-(6). The rule generation module 135 may model the behavior of a primary service (e.g., web service, cloud service, mobile application, etc.) using a BoD approach. The rule generation module 135 may classify certain traffic as belonging to a corresponding primary service. More specifically, rule generation module 135 may analyze and classify each new flow, and subse-

---

Algorithm 2 BoD_update(f, C, BoDs)

---

Input:
    f                                        ▷ The current flow
    $C = \{c_1,...,c_k\}$            ▷ Core Domains
    $BoDs = \{BoD_{c_1},...,BoD_{c_k}\}$   ▷ BoDs of core domains in C
1:   t = GetTime( )              ▷ Get current time
2:   $d_f \leftarrow$ parse(f)              ▷ Get the domain of f
3:   $(t_c, c) \leftarrow$ OW            ▷ Retrieve current OW if any
4:   if OW $\neq \emptyset \wedge t - t_c \geq T_{ow}$ then
5:       OW $\leftarrow \emptyset$            ▷ Remove the OW if expired
6:   // Put domains in the Bag if OW exists
7:   if OW $\neq \emptyset$ then
8:       $BoD_c(d_f)$ += 1
9:   else
10:     if $d_f \in C \wedge t - t_{last} > T_{idle}$ then
11:         OW $\leftarrow (t, d_f)$       ▷ Open a new OW
12:         $freq_{d_f}$ += 1          ▷ Update CD frequency
13:   $t_{last} \leftarrow t$                ▷ Update last flow time

---

To distinguish false support domains, the BoD training submodule 325 may compute the frequency with which each domain appears in $BoD_C$ across multiple observations (e.g., domains below a minimum frequency threshold are filtered out of $BoD_c$). Thus, actual support domains emerge, and the BoD training submodule 325 may filter out false support domains based on frequency of appearance. The BoD training submodule 325 may monitor traffic from all clients to learn a $BoD_c$ such that information is accumulated over time and in different conditions (e.g., different identities, time, quently impose the most appropriate actions by downloading the corresponding rules to network elements 110(1)-(6) through SDN controller 140. Rule generation module 135 may classify a flow based on the first packet in the flow, thereby permitting the controller 140 to promptly install the appropriate rules on the network elements 110(1)-(6). As such, network elements 110(1)-(6) may directly forward (or discard) subsequent packets in the same flow instead of, for example, forwarding the subsequent packets to the SDN controller 140.

Thus, rule generation module 135 creates a model of web services, cloud applications, mobile applications using information from the DNS 125 and machine learning algorithms. Based on this model, rule generation module 135 devises rules to be installed in network elements 110(1)-(6) to classify and steer flows based on the generating service. Rule generation module 135 may perform classification on a flow-by-flow basis (e.g., based on just the first packet of the flow and in line with the traffic). This classification may be split among the SDN application 130 and the data plane. In addition, the rule generation module may automatically create models (e.g., BoD training) based on information collected in the data plane when traffic is forwarded. Using a BoDs model to cause controller 140 to implement rules in network elements 110(1)-(6) is technically challenging because, among other things, the BoD model is stateful while the installed rules are stateless.

Whereas conventional attempts to bring application awareness to a SDN operate on a simple per-flow basis, rule generation module 135 operates based on stateful information (i.e., the past history of flows), early classification with low overhead, scalability, and compliance with SDN specifications. With respect to the comprehensive policing of services, rule generation module 135 creates forwarding rules that address complex relations among flows by learning which domains are typically contacted when accessing each service, even though each rule refers to a single flow. Rule generation module 135 automatically learns models to translate high-level descriptions of services into low-level rules with unsupervised algorithms, thereby minimizing human intervention. This enables extending the application of policies to a large fraction of traffic (i.e., support flows) that would not be subject to policies operating on a simple per-flow basis (i.e., including only flows to core domains).

With respect to early classification with low overhead, the rule generation module 135 may produce forwarding decisions based on the very first packet of each flow. Thus, the controller 140 and SDN application 130 handle a reasonable load and the latency of subsequent packets of a flow is not increased by the processing within the SDN application 130. And if a situation arises in which the controller 140 examines a large number of packets in a short period of time, load-balancing solutions may be employed. With respect to scalability, most traffic is handled by the data plane, which processes traffic very efficiently based on simple forwarding rules. Hence, rule generation module 135 provides the flexibility of a service/application-level policy engine with the complexity and scalability of a layer ¾ switch. With respect to compliance with SDN specifications, the techniques described herein are fully compliant with basic SDN architecture and the latest version of OpenFlow (although these techniques may be deployed via any communication protocols between the controller 130 and network elements 110(1)-(6)). Further, rule generation module 135 requires no changes to current Application Program Interfaces (APIs) or controllers, hence allowing for implementation on existing SDN platforms. In addition to the advantages described above, techniques described herein are also compatible with prevention solutions for denial-of-service attacks.

Figure 6:
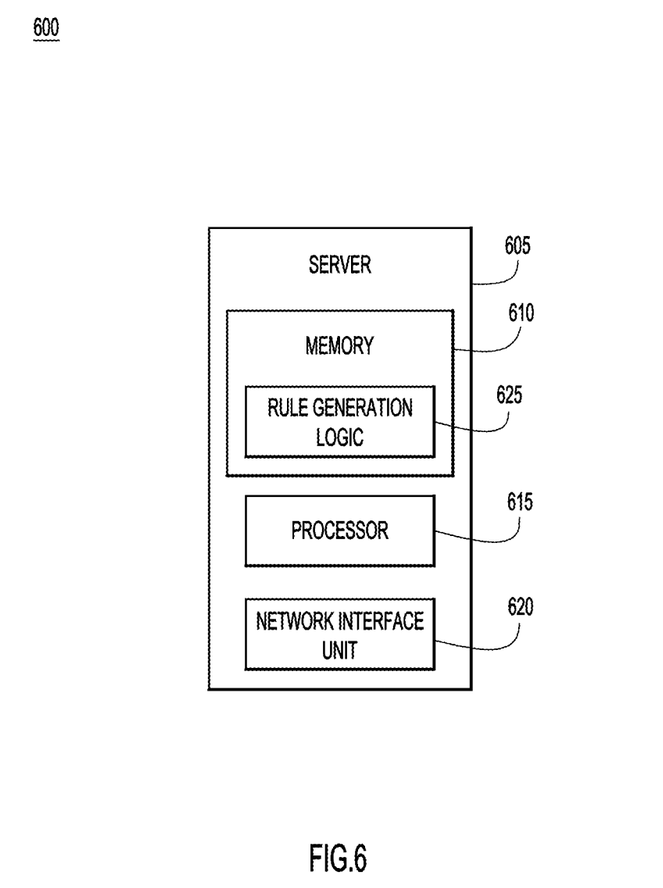
FIG. 6 is a block diagram of a computing device configured to execute the automated flow management techniques presented herein, according to an example embodiment.

FIG. 6 is a block diagram 600 of a server 605 that is configured to implement the techniques presented herein. In this example, the server 605 includes memory 610, one or more processors 615, and a network interface unit 620. The network interface unit 620 may take the form of one or more network interface cards, for example. The memory 610 includes rule generation logic 625. The one or more processors 615 are configured to execute instructions stored in the memory 610 (e.g., rule generation logic 625). When executed by the one or more processors 615, rule generation logic 625 enables server 605 to perform the operations associated with rule generation module 135 (FIG. 1). The memory 610 may be read only memory (ROM), random access memory (RAM), magnetic disk storage media devices, optical storage media devices, flash memory devices, electrical, optical, or other physical/tangible memory storage devices. Thus, in general, the memory 610 may include one or more tangible (non-transitory) computer readable storage media (e.g., a memory device) encoded with software comprising computer executable instructions and when the software is executed (by the processor 615) it is operable to perform the operations described herein.

Figure 7:
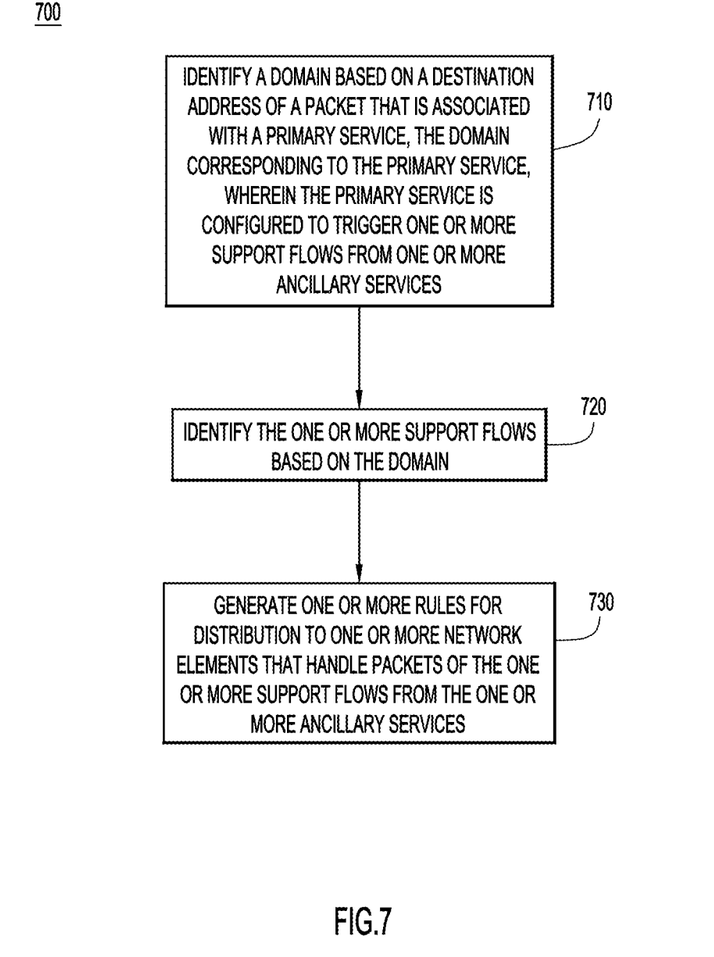
FIG. 7 is a high-level flowchart of the automated flow management method in accordance with an example embodiment.

FIG. 7 is a flowchart 700 of a method in accordance with examples presented herein. At 710, a domain is identified based on a destination address of a packet that is associated with a primary service, the domain corresponding to the primary service, wherein the primary service is configured to trigger one or more support flows from one or more ancillary services. At 720, the one or more support flows are identified based on the domain. At 730, one or more rules are generated for distribution to one or more network elements that handle packets of the one or more support flows from the one or more ancillary services.

In one form, a method is provided. The method comprises: identifying a domain based on a destination address of a packet that is associated with a primary service, the domain corresponding to the primary service, wherein the primary service is configured to trigger one or more support flows from one or more ancillary services; identifying the one or more support flows based on the domain; and generating one or more rules for distribution to one or more network elements that handle packets of the one or more support flows from the one or more ancillary services.

In another form, an apparatus is provided. The apparatus comprises: a network interface unit configured to enable network communications; and one or more processors configured to: identify a domain based on a destination address of a packet that is associated with a primary service, the domain corresponding to the primary service, wherein the primary service is configured to trigger one or more support flows from one or more ancillary services; identify the one or more support flows based on the domain; and generate one or more rules for distribution to one or more network elements that handle packets of the one or more support flows from the one or more ancillary services.

In another form, one or more non-transitory computer readable storage media are provided. The non-transitory computer readable storage media are encoded with instructions that, when executed by a processor, cause the processor to: identify a domain based on a destination address of a packet that is associated with a primary service, the domain corresponding to the primary service, wherein the primary service is configured to trigger one or more support flows from one or more ancillary services; identify the one or more support flows based on the domain; and generate one or more rules for distribution to one or more network elements that handle packets of the one or more support flows from the one or more ancillary services.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining, from a user, an indication of an association of a domain corresponding to a primary service and one or more support domains corresponding to one or more ancillary services, wherein the primary service is configured to trigger one or more support flows from the one or more ancillary services;
identifying the domain based on a destination address of a packet that is associated with the primary service;
identifying the one or more support flows based on the domain; and
generating one or more rules for distribution to one or more network elements that handle packets of the one or more support flows from the one or more ancillary services.

2. The method of claim 1, further comprising:
before identifying the domain, obtaining the packet from a network controller; and
after generating the one or more rules, forwarding the packet to the network controller or declining to forward the packet to the network controller.

3. The method of claim 1, further comprising:
obtaining, from a domain name server, information indicating an association of the destination address of the packet with the domain.

4. The method of claim 1, further comprising:
monitoring one or more previous flows that enabled direct access to the primary service, the primary service having triggered one or more previous support flows from the one or more ancillary services; and
producing, based on the monitoring, an indication of an association of the domain and the one or more support domains corresponding to the one or more ancillary services.

5. The method of claim 1, further comprising:
storing the indication.

6. The method of claim 1, further comprising:
determining at least one of a number of times the primary service is directly accessed, an amount of traffic generated when the primary service is accessed, or a number of packets exchanged when the primary service is accessed.

7. The method of claim 1, wherein the one or more rules include one or more of:
a rule to block the one or more support flows;
a rule to route the one or more support flows on a specific path or to a specific device; or
a rule to prioritize or deprioritize the one or more support flows relative to one or more other network flows.

8. An apparatus comprising:
a network interface unit configured to enable network communications; and
one or more processors coupled to the network interface unit, wherein the one or more processors are configured to:
obtain, from a user, an indication of an association of a domain corresponding to a primary service and one or more support domains corresponding to one or more ancillary services, wherein the primary service is configured to trigger one or more support flows from the one or more ancillary services;
identify the domain based on a destination address of a packet that is associated with the primary service;
identify the one or more support flows based on the domain; and
generate one or more rules for distribution to one or more network elements that handle packets of the one or more support flows from the one or more ancillary services.

9. The apparatus of claim 8, wherein the one or more processors are further configured to:
before identifying the domain, obtain the packet from a network controller; and
after generating the one or more rules, forward the packet to the network controller or decline to forward the packet to the network controller.

10. The apparatus of claim 8, wherein the one or more processors are further configured to:
obtain, from a domain name server, information indicating an association of the destination address of the packet with the domain.

11. The apparatus of claim 8, wherein the one or more processors are further configured to:
monitor one or more previous flows that enabled direct access to the primary service, the primary service having triggered one or more previous support flows from the one or more ancillary services; and
produce, based on the monitoring, an indication of an association of the domain and the one or more support domains corresponding to the one or more ancillary services.

12. The apparatus of claim 8, wherein the one or more processors are further configured to:
store the indication.

13. The apparatus of claim 8, wherein the one or more processors are further configured to:
determine at least one of a number of times the primary service is directly accessed, an amount of traffic generated when the primary service is accessed, or a number of packets exchanged when the primary service is accessed.

14. The apparatus of claim 8, wherein the one or more rules include one or more of:
a rule to block the one or more support flows;
a rule to route the one or more support flows on a specific path or to a specific device; or
a rule to prioritize or deprioritize the one or more support flows relative to one or more other network flows.

15. One or more non-transitory computer readable storage media encoded with instructions that, when executed by a processor, cause the processor to:
obtain, from a user, an indication of an association of a domain corresponding to a primary service and one or more support domains corresponding to one or more ancillary services, wherein the primary service is configured to trigger one or more support flows from the one or more ancillary services;
identify the domain based on a destination address of a packet that is associated with the primary service;
identify the one or more support flows based on the domain; and
generate one or more rules for distribution to one or more network elements that handle packets of the one or more support flows from the one or more ancillary services.

16. The one or more non-transitory computer readable storage media of claim 15, wherein the instructions further cause the processor to:
before identifying the domain, obtain the packet from a network controller; and after generating the one or more rules, forward the packet to the network controller or decline to forward the packet to the network controller.

17. The one or more non-transitory computer readable storage media of claim 15, wherein the instructions further cause the processor to:
obtain, from a domain name server, information indicating an association of the destination address of the packet with the domain.

18. The one or more non-transitory computer readable storage media of claim 15, wherein the instructions further cause the processor to:
monitor one or more previous flows that enabled direct access to the primary service, the primary service having triggered one or more previous support flows from the one or more ancillary services; and
produce, based on the monitoring, an indication of an association of the domain and the one or more support domains corresponding to the one or more ancillary services.

19. The one or more non-transitory computer readable storage media of claim 15, wherein the instructions further cause the processor to:
store the indication.

20. The one or more non-transitory computer readable storage media of claim 15, wherein the instructions further cause the processor to:
determine at least one of a number of times the primary service is directly accessed, an amount of traffic generated when the primary service is accessed, or a number of packets exchanged when the primary service is accessed.

\* \* \* \* \*

UNITED STATES PATENT AND TRADEMARK OFFICE
CERTIFICATE OF CORRECTION

PATENT NO. : 10,491,529 B2
APPLICATION NO. : 15/639914
DATED : November 26, 2019
INVENTOR(S) : Mario Baldi et al.

It is certified that error appears in the above-identified patent and that said Letters Patent is hereby corrected as shown below:

On the Title Page

Item (72) Inventors:

Please change "Marco Mellia, Turin (IT)" to --Marco Mellia, Torino (IT)--

Please change "Martino Trevisan, Turin (IT)" to --Martino Trevisan, Torino (IT)--

Please change "Idilio Drago, Turin (IT)" to --Idilio Drago, Torino (IT)--

Signed and Sealed this
Fourth Day of February, 2020

Andrei Iancu
*Director of the United States Patent and Trademark Office*